United States Patent
Lee et al.

(10) Patent No.: US 9,720,949 B2
(45) Date of Patent: Aug. 1, 2017

(54) CLIENT-SIDE PARTITION-AWARE BATCHING OF RECORDS FOR INSERT OPERATIONS

(71) Applicants: Chul Won Lee, Seoul (KR); Juchang Lee, Seoul (KR); Alexander Schroeder, Berlin (DE); Myunggon Park, Seoul (KR); Sang Kyun Cha, Seoul (KR)

(72) Inventors: Chul Won Lee, Seoul (KR); Juchang Lee, Seoul (KR); Alexander Schroeder, Berlin (DE); Myunggon Park, Seoul (KR); Sang Kyun Cha, Seoul (KR)

(73) Assignee: SAP SE, Walldorf (DE)

( * ) Notice: Subject to any disclaimer, the term of this patent is extended or adjusted under 35 U.S.C. 154(b) by 579 days.

(21) Appl. No.: 14/271,218

(22) Filed: May 6, 2014

(65) Prior Publication Data
US 2015/0149413 A1    May 28, 2015

Related U.S. Application Data

(60) Provisional application No. 61/907,519, filed on Nov. 22, 2013.

(51) Int. Cl.
*G06F 17/30* (2006.01)
(52) U.S. Cl.
CPC .... *G06F 17/30345* (2013.01); *G06F 17/3038* (2013.01)

(58) Field of Classification Search
CPC ....................... G06F 17/3038; G06F 17/30345
See application file for complete search history.

(56) References Cited

U.S. PATENT DOCUMENTS

| | | | |
|---|---|---|---|
| 7,475,055 B2* | 1/2009 | Hutchison | G06F 17/30545 |
| 7,765,549 B1* | 7/2010 | Lauer | G06F 9/5005 |
| | | | 707/705 |
| 8,364,751 B2* | 1/2013 | Meijer | G06F 17/30477 |
| | | | 709/203 |
| 9,262,476 B2* | 2/2016 | Eliaš | G06F 17/30451 |
| 2006/0074937 A1* | 4/2006 | Bird | G06F 7/00 |

(Continued)

OTHER PUBLICATIONS

Banerjee, "Table Partitioning in SAP HANA Database," 2 pp., downloaded from http://debajitb.wix.com/debajitbanerjee/apps/blog/table-partitioning-in-sap-hana-database (Aug. 2013).

(Continued)

*Primary Examiner* — Robert Beausoliel, Jr.
*Assistant Examiner* — Arthur Ganger
(74) *Attorney, Agent, or Firm* — Klarquist Sparkman, LLP

(57) ABSTRACT

Client-side partition-aware batch insert operations are presented. For example, a server generates partition metadata, which is provided to a client. The client uses the partition metadata to determine the database nodes to which to send batch insert requests. For example, the client divides batch insert data, such as records for a partitioned table, among multiple database nodes having partitions of the table. The client issues batch insert requests to the respective database nodes for execution. When executed by the database nodes, batch insert operations can be performed in parallel.

20 Claims, 7 Drawing Sheets

(56) References Cited

U.S. PATENT DOCUMENTS

| | | | | |
|---|---|---|---|---|
| 2011/0173619 | A1* | 7/2011 | Fish | G06F 17/30371 718/101 |
| 2011/0179105 | A1* | 7/2011 | Lindsay | G06F 9/5061 709/203 |
| 2013/0159265 | A1* | 6/2013 | Peh | G06F 17/30584 707/703 |
| 2013/0275457 | A1* | 10/2013 | Lee | G06F 17/30545 707/769 |
| 2013/0275550 | A1* | 10/2013 | Lee | G06F 17/30545 709/217 |
| 2014/0156636 | A1* | 6/2014 | Bellamkonda | G06F 17/30489 707/718 |

OTHER PUBLICATIONS

Jones, "HANA Table Partitioning—First Thoughts," 3 pp., downloaded from http://scn.sap.com/community/developer-center/hana/blog/2012/10/09/hana-table-partitioning--first-thoughts (Oct. 2012).

SAP AG, "SAP HANA Platform SPS 06—SAP HANA Administration Guide," document version: 1.0, 375 pp. (Jun. 2013).

SAP AG, "SAP HANA Platform SPS 06—SAP HANA Administration Guide," document version: 1.2, 385 pp. (Sep. 2013).

SAP AG, "SAP HANA Appliance Software SPS 05—What's New—Release Notes," document version 1.1, 25 pp. (Dec. 2012).

SAP AG, "Introduction to Partitioning," 8 pp., downloaded from https://cookbook.experiencesaphana.com/bw/operating-bw-on-hana/hana-database-administration/system-configuration/partitioning-and-distribution-large-tables/ (downloaded on Mar. 13, 2014—document not dated).

Singh, "SAP HANA DB: Partitioning and Distribution of Large Tables," 5 pp., downloaded from http://www.saptechies.org/sap-hana-db-partitioning-distribution-large-tables/ (Oct. 2012).

* cited by examiner software 180 implementing one or more innovations for client-side partition-aware batching of records for insert operations

CLIENT-SIDE PARTITION-AWARE BATCHING OF RECORDS FOR INSERT OPERATIONS

CROSS REFERENCE TO RELATED APPLICATION

This application claims the benefit of U.S. Provisional Patent Application No. 61/907,519, filed Nov. 22, 2013, the disclosure of which is hereby incorporated by reference.

FIELD

Batch insertion of records in a distributed database system.

BACKGROUND

A database is an organized collection of data. Conceptually, data in a database can be organized as one or more tables, where a table is a two-dimensional structure with data values organized in rows and columns. A record of a table contains the data values for one row of the table. A column of the table contains the data values of one field of the table across multiple records (rows) of the table.

In a distributed database system, a database can be spread across multiple database nodes, which can be located at different physical locations and operated by different database servers. A database table can be split, or partitioned, such that different records of the table are stored at different database nodes. Values of a database can be inserted, deleted, edited or otherwise manipulated. Previous approaches to inserting a batch of new records in a partitioned table can be inefficient in terms of the computational load at database nodes and network bandwidth utilization, especially if records are distributed between 3, 4, or more database nodes, or if a batch includes a very large number of records to be inserted.

SUMMARY

In summary, the detailed description presents innovations in the area of batch insert operations for records of a database partitioned between different nodes of a distributed database system. In many scenarios, the innovations can reduce the overall computational load at database nodes and reduce network bandwidth utilization, while facilitating parallel processing of batch insert operations at different database nodes.

According to a first aspect of the innovations described herein, a server generates partition metadata. The partition metadata indicates how to partition records between database nodes. In particular, the partition metadata includes partitioning criteria for records for insert operations. The server transfers the partition metadata to a client for use in client-side partition-aware routing. For example, the partition metadata is transferred as part of a reply to a request from the client to compile a query.

According to another aspect of the innovations described herein, a client splits records for insert operations into batches according to partition metadata. The partition metadata indicates how to partition the records between database nodes. For example, for one of the records, the client (1) determines one of the database nodes (or a location), and (2) adds the record to a batch for the determined database node or location. Based on partitioning criteria for one or more parameters values of a record, the client can select an appropriate database node or location (e.g., using a hash key calculated from the parameter value(s)). Or, the client can select a database node or location according to a round-robin pattern.

Later, the client issues a batch insert request for a given batch for execution (e.g., by a server operating a database node). For example, the client issues the batch insert request for the given batch after the batch has been filled to a batch size. The client can then continue splitting records into batches without waiting for a reply from the server for the batch insert request. In this way, the client can issue batch insert requests for batches to different database nodes for execution (at the database nodes) in parallel.

The foregoing and other objects, features, and advantages of the invention will become more apparent from the following detailed description, which proceeds with reference to the accompanying figures.

DETAILED DESCRIPTION

The detailed description presents innovations in the area of batch insert operations for records of a database partitioned between different nodes of a distributed database system. In many scenarios, the innovations can reduce the overall computational load at database nodes and reduce network bandwidth utilization, while facilitating parallel processing of batch insert operations at different database nodes.

The different database nodes are part of a distributed database system. A distributed database system has two or more database nodes. Depending on implementation, each of the different database nodes can be operated by a corresponding, different server. Or, multiple database nodes can be operated by the same server.

The data at different database nodes in the distributed database system can be a database table that is partitioned (that is, divided, split) between database nodes. The database table can be partitioned between rows (different rows in different partitions) and/or between columns (different column in different partitions). The database nodes of a distributed database system can contain one or more partitions (parts) of partitioned tables. Alternatively, the partitioned data is organized in some other way.

I. Example Computing Systems and Cloud Computing Environments.

Figure 1:
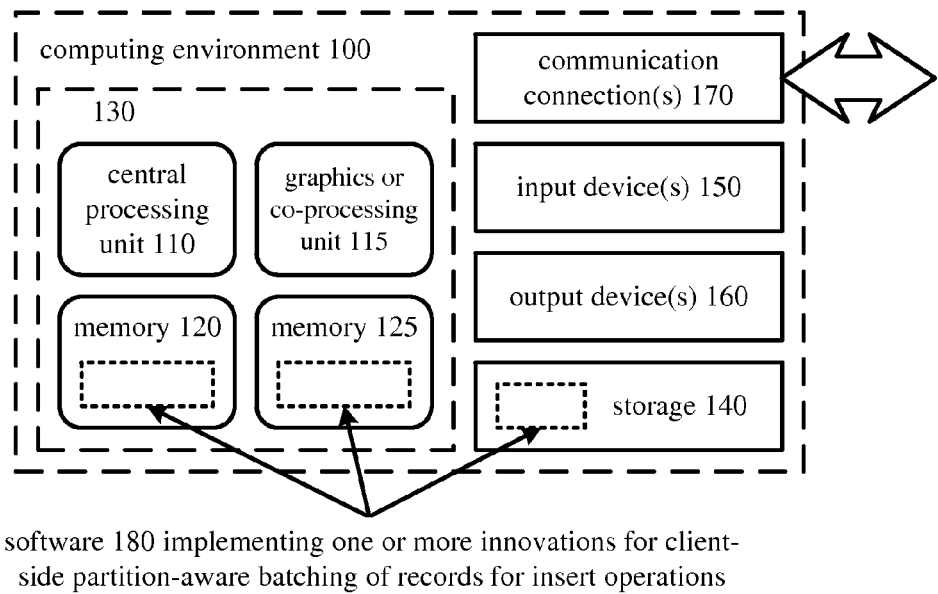
FIG. 1 is a diagram illustrating an example computing system in which some described embodiments can be implemented.

FIG. 1 depicts a generalized example of a suitable computing system (100) in which the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for client-side partition-aware batching of records for insert operations, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for client-side partition-aware batching of records for insert operations.

The input device(s) (150) may be a touch input device such as a keyboard, mouse, pen, or trackball, a voice input device, a scanning device, or another device that provides input to the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, or other carrier.

Figure 2:
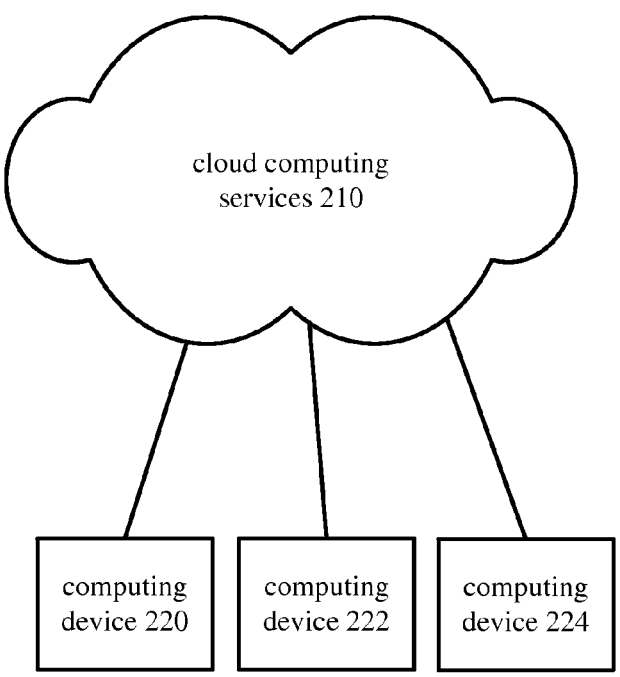
FIG. 2 is a diagram illustrating an example cloud computing environment in which some described embodiments can be implemented.

FIG. 2 depicts an example cloud computing environment (200) in which described innovations can be implemented. The cloud computing environment (200) includes cloud computing services (210). The cloud computing services (210) can include various types of cloud computing resources, such as computer servers, data storage repositories, networking resources, etc. The cloud computing services (210) can be centrally located (e.g., provided by a data center of a business or organization) or distributed (e.g., provided by various computing resources located at different locations, such as different data centers and/or located in different cities or countries).

The cloud computing services (210) are utilized by various types of computing devices (e.g., client computing devices), such as computing devices (220, 222, and 224). For example, the computing devices (e.g., 220, 222, and 224) can be computers (e.g., desktop or laptop computers), mobile devices (e.g., tablet computers or smart phones), or other types of computing devices. For example, the computing devices (e.g., 220, 222, and 224) can utilize the cloud computing services (210) to perform computing operators (e.g., data processing, data storage, and the like).

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 1, computer-readable storage media include memory (120 and 125), and storage (140). The term computer-readable storage media does not include signals and carrier waves. In addition, the term computer-readable storage media does not include communication connections (e.g., 170).

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

II. Examples of Server-Side Partition-Aware Batching of Records for Insert Operations.

In general, for server-side partition-aware batching of records for insert operations, a server generates and stores partition metadata. When the server receives a batch insert request from a client, the server can use the partition metadata to determine which records of the batch insert request to process locally and which records of the batch insert request to forward to other database nodes.

Figure 3:
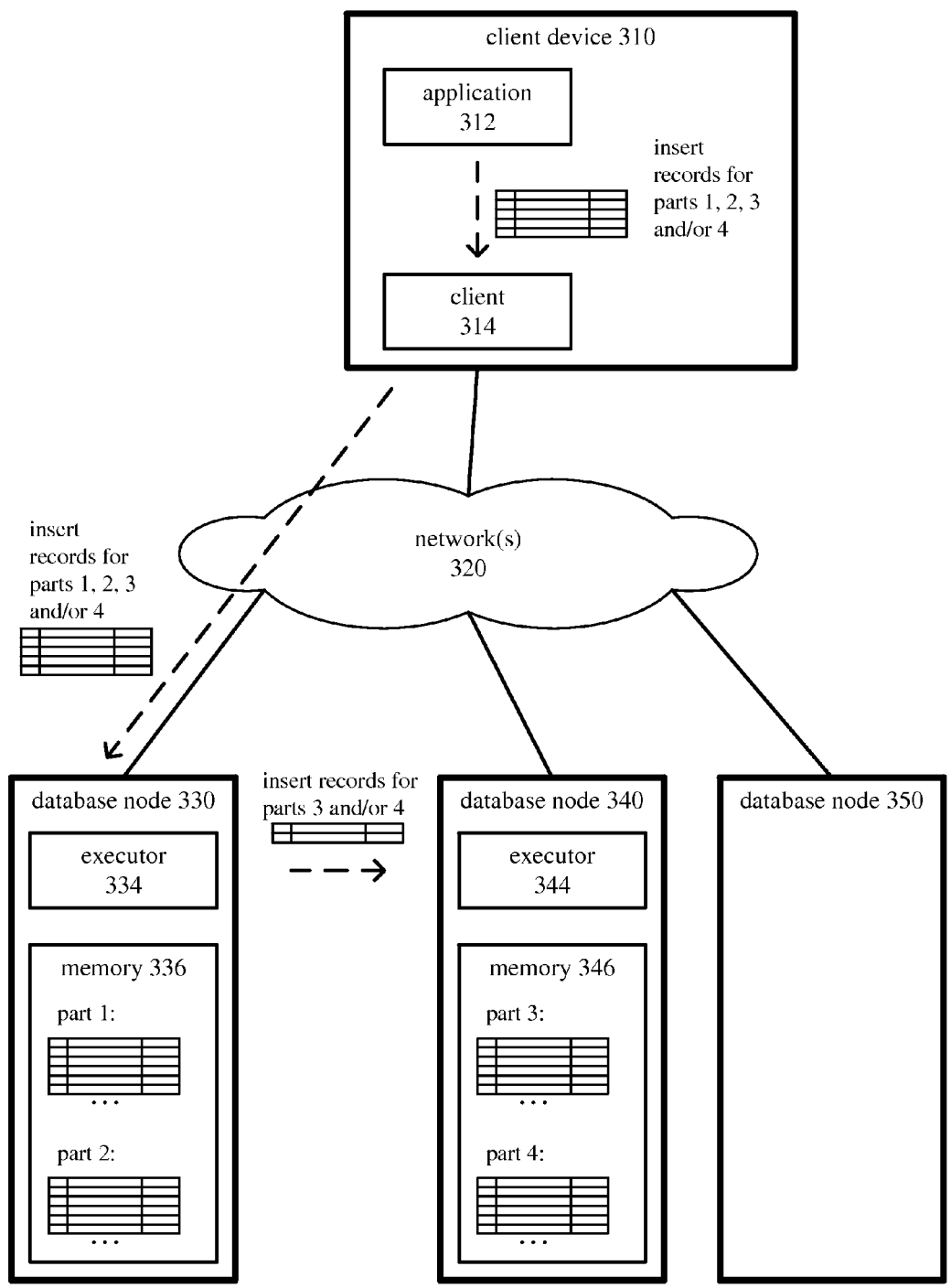
FIG. 3 is a diagram illustrating server-side splitting of records into batches according to partition metadata.

FIG. 3 illustrates server-side partition-aware routing when inserting a batch of records into a partitioned table. FIG. 3 shows four partitions (parts 1 . . . 4) of a database table. Memory (336) at a first database node (330) includes the records for partition 1 and partition 2 of the table. Memory (346) at a second database node (340) includes the records for partition 3 and partition 4 of the table. A third database node (350) in the system does not include any partitions for the table.

In FIG. 3, a client device (310) includes an application (312) and database client (314) (or simply "client"). The application (312) requests that a batch of multiple records be inserted into the table. The batch can include data for records for partition 1, partition 2, partition 3 and/or partition 4. Using a basic client-side routing scheme, the client (314) selects one of the database nodes (330, 340, 350) to receive the request for all of the records. Over one or more networks (320), the client (314) transmits the request to insert the entire batch of records, including data for the records, to the database node (330) that stores partitions 1 and 2 of the table.

A module of the database server that operates the database node (330), which is shown as the executor (334), executes the request to insert the batch of records. A cache at the database node (330) can store an execution plan associated with partition information. The execution plan indicates how to perform operations for the request using previously prepared instructions (e.g., compiled code). The partition information indicates criteria for partitioning records of the table as well as locations for the partitions of the table. Thus, the executor (334) processes the request using the execution plan and the partition information. According to the partition information, any new records for partitions 1 and/or 2 are inserted into the appropriate partitions in memory (336) at the database node (330). The executor (334) also identifies other records in the batch that should be routed to another database node. In FIG. 3, the database node (330) re-transmits the request to insert records for partitions 3 and/or 4, including the data for those records, to the database node (340). The executor (344) at that database node (340) executes the request to insert the records for partitions 3 and/or 4, using partition information (and an execution plan) stored in a cache at the database node (340). Any new records for partitions 3 and/or 4 are inserted into the appropriate partitions in memory (346) at the database node (340).

In this way, the request to insert the batch of records for partitions 1, 2, 3 and/or 4 is successfully processed. Part of the request (relating to any records for partitions 3 and/or 4) is processed multiple times, however, and the data for such records is transmitted to one database node (330) then re-transmitted to another database node (340).

III. Examples of Client-Side Partition-Aware Batching of Records for Insert Operations.

In general, for client-side partition-aware batching of records for insert operations, a server generates partition metadata that is provided to a client (e.g., a database client at a client computing device). The client can then use the partition metadata to determine the database nodes to which to send batch insert requests. For example, the client divides batch insert data (e.g., for particular records of a table) among multiple database nodes. In many cases, batch insert options for different partitions can then be performed in parallel at different database nodes.

A partitioned table has partitioning criteria to distinguish the partitions in which data should be stored. In the server-side partitioning approach (explained with reference to FIG. 3), to insert a batch of records into partitions of a table, a client provides data for the records to a server that operates a database node, and the server distributes the data for the records within the distributed database system. In contrast, with client-side partition-aware routing, some distribution logic is moved to the client-side, and the client can help parallelize batch insert operations in the respective database nodes by early distribution of data for records to the respective database nodes.

Figure 4A:
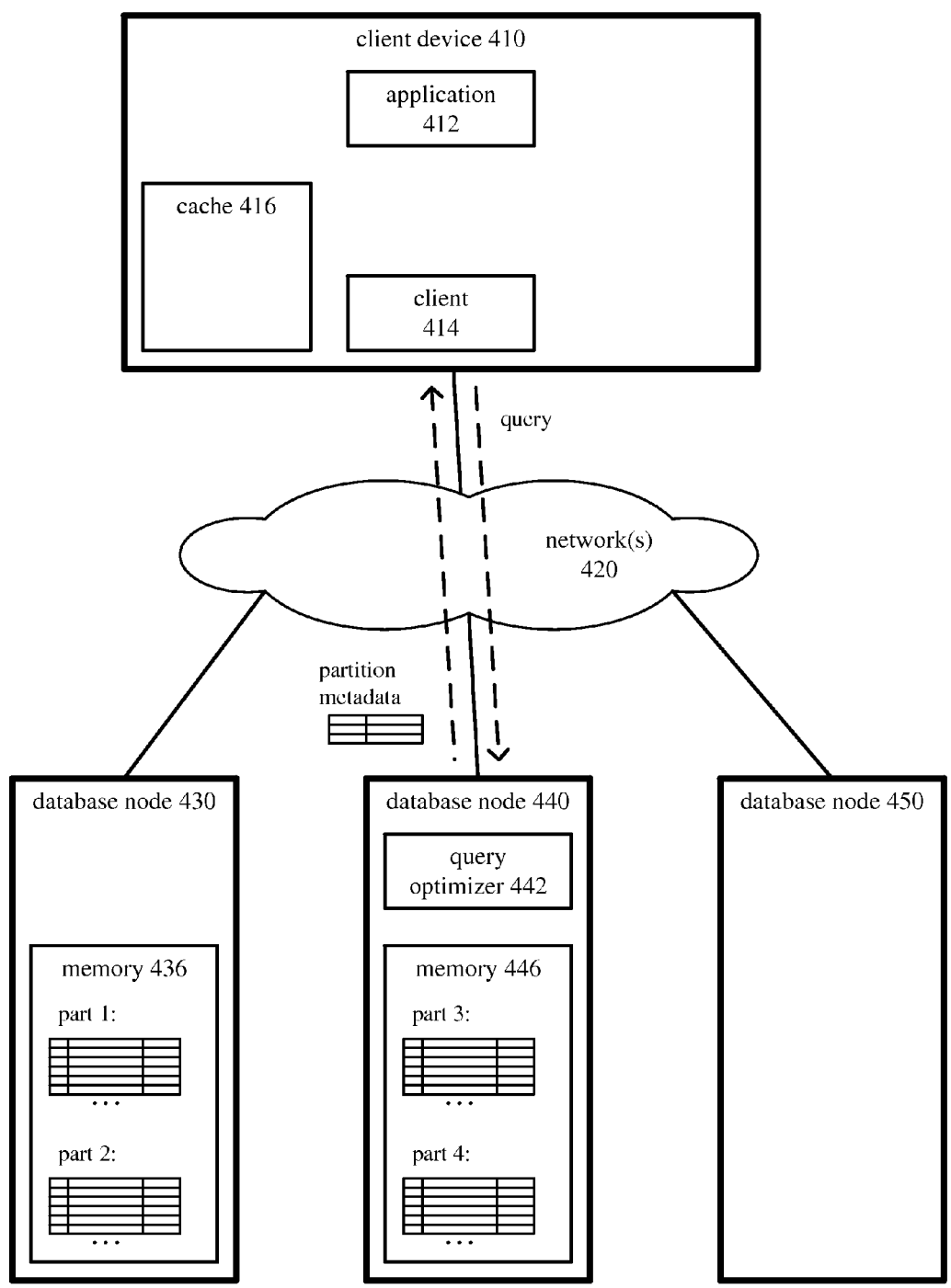
FIG. 4a is a diagram illustrating generation of partition metadata for a partitioned table using a query optimizer at a database node.

FIG. 4a illustrates generation of partition metadata for a partitioned table using a query optimizer at a database node, for client-side partition-aware routing. The database environment (400) includes a client device (410) separated be one or more networks (420) from three database nodes (430, 440, 450). The table is split into four partitions. Memory (436) at a first database node (430) stores records for partitions 1 and 2, and memory (446) at a second database node (440) stores records for partitions 3 and 4. A third database node (450) does not include any partitions for the table.

The client device (410) includes a database client (414) (or simply "client") as well as an application (412) that works with the client (414). The client (414) can work with any of multiple applications. Or, the application (412) and client (414) can be combined, such that the client (414) is part of the application (412).

The client device (410) includes a cache (416) that can store partition metadata. The client (414) can use cached partition metadata for client-side partition-aware routing of batch insert requests. Initially, however, the client device (410) lacks the partition metadata. Therefore, the client (414) sends a query (e.g., a type of query for an insert operation) to the database node (440) (or another database node). A server that operates the database node (440) includes a query optimizer (442), which processes the query and returns partition metadata to the client device (410), where it is stored in the cache (416). The partition metadata can include partitioning criteria and parameter information, which the client (414) can use to determine database nodes/locations for routing of individual records for batch insert operations.

Figure 4B:
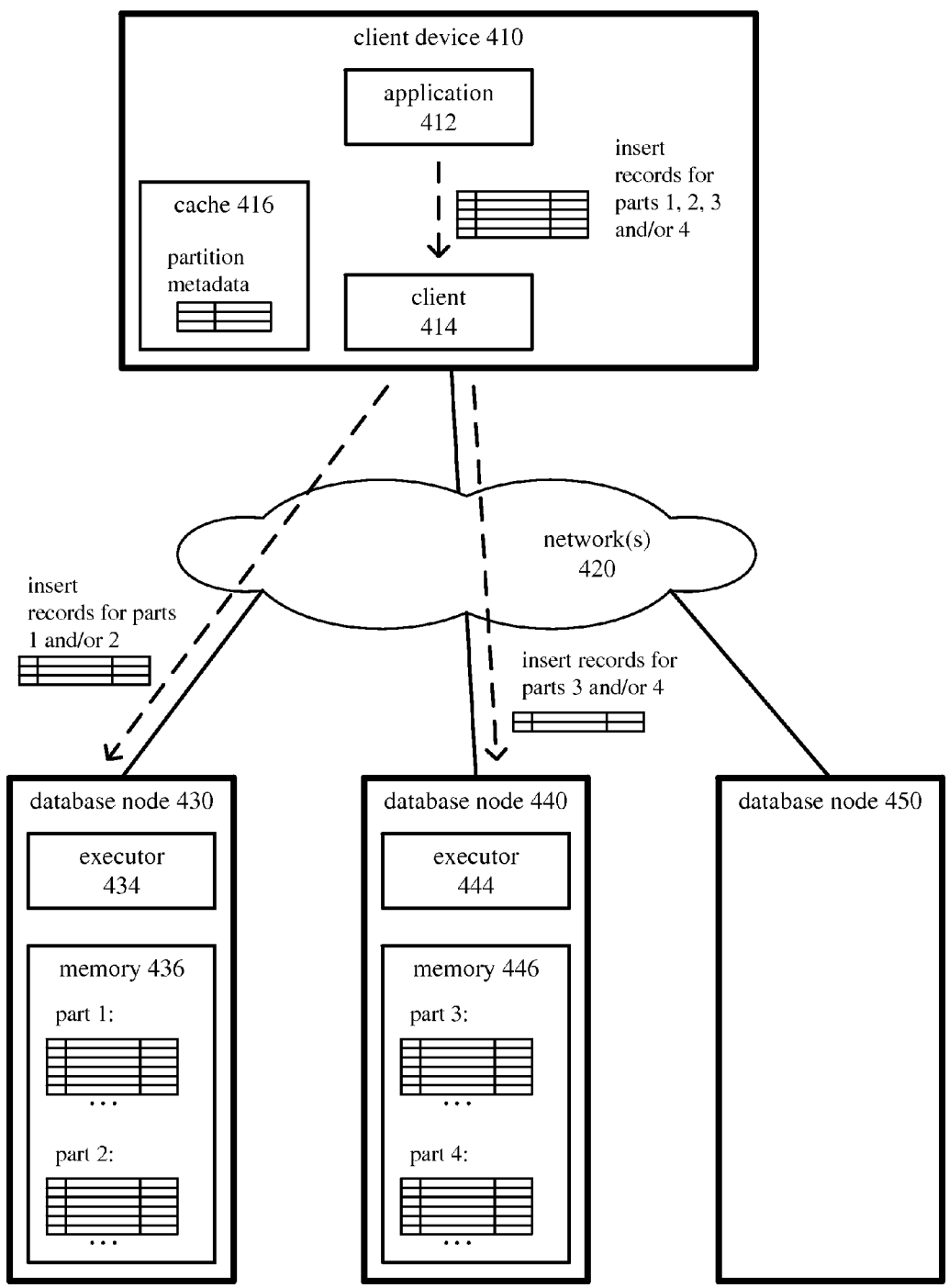
FIG. 4b is a diagram illustrating client-side splitting of records into batches according to partition metadata.

For the same database environment (400), FIG. 4b illustrates client-side splitting of records into batches. The application (412) requests a batch insert operation for a partitioned table, requesting that a batch of records be inserted. Using the partition metadata in the cache (416), the client (414) determines the database nodes/locations that have the partitions appropriate for the respective records. The client (414) issues a batch insert request for the records for partitions 1 and/or 2 to the first database node (430). The client (414) also issues a batch insert request for the records for partitions 3 and/or 4 to the second database node (440). Thus, the client (414) splits the new records into sets, and the sets of records are transferred from the client (414) to multiple database nodes (430, 440).

An executor (434) at the first database node (430) processes the batch insert request for the records for partitions 1 and/or 2, inserting each of the records in the appropriate partition. Similarly, an executor (444) at the second database node (440) processes the batch insert request for the records for partitions 3 and/or 4, inserting each of the records in the appropriate partition.

IV. Example Techniques for Generating Partition Metadata.

Figure 5:
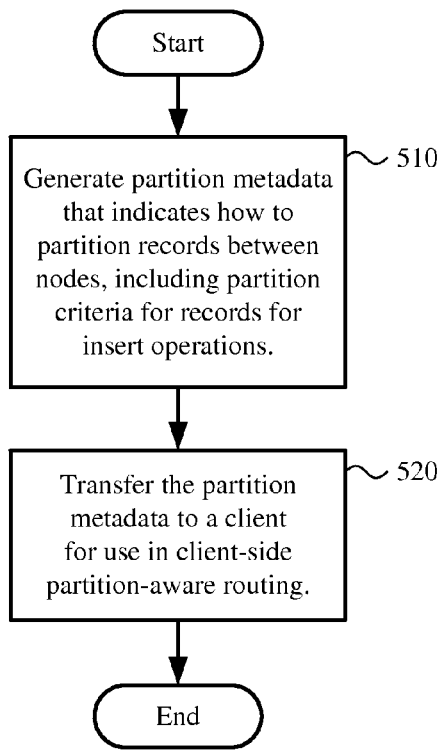
FIG. 5 is a flowchart illustrating a generalized technique for generating partition metadata.

FIG. 5 shows a generalized technique (500) for generating partition metadata for use in client-side partition-aware routing. A server that operates a database node can perform the technique (500). Alternatively, another server performs the technique (500).

The server generates (510) partition metadata that indicates how to partition records between database nodes. In general, the partition metadata includes partitioning criteria for records for insert operations. In some example implementations, the server generates the partition metadata by collecting partitioning criteria for a partitioned table, location information for partitions of the table, information about order of data values in records and information about data types of the data values in records. For partition-aware routing decisions, the information about the order and data types of data values in records can be used when calculating a hash key value that is to be mapped to a partition (and hence a database node or location) for a hash-partitioned table.

The server transfers (520) the partition metadata to a client for use in client-side partition-aware routing. For example, the server transmits the partition metadata across a network to a client device. The partition metadata can be transferred as part of a reply to a request from the client (e.g., a request to compile a query). Or, the partition metadata can be transferred as part of an update to partition metadata previously transferred to the client (e.g., if the partitioning criteria have changed, or the partition locations have changed).

Figure 6:
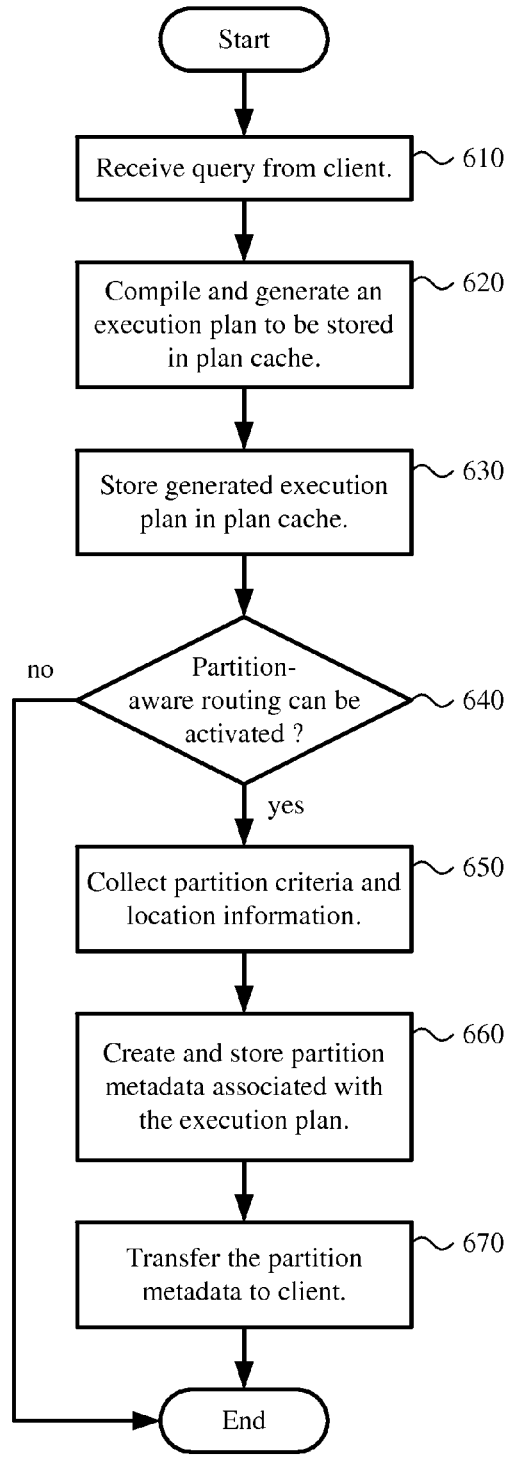
FIG. 6 is a flowchart illustrating an example technique for generating partition metadata for a partitioned table using a query optimizer at a database node.

FIG. 6 shows an example technique (600) for generating partition metadata for a partitioned table, using a query optimizer at a database node, for use in client-side partition-aware routing. A query optimizer of a server that operates a database node can perform the technique (600) during query compilation.

The query optimizer receives (610) a query from a client (e.g., a query compilation request for an insert operation). In response, the query optimizer analyzes the query. In particular, the query optimizer compiles and generates (620) an execution plan for batch insert operations that is to be stored in a plan cache (at database nodes). The execution plan indicates how to perform batch insert operations for a request using instructions (e.g., compiled code). At runtime, a client can provide data for records as sets of parameter values ("parameter sets") to be used with the execution plan, for efficient execution of the operations of a request. The query optimizer stores (630) the generated execution plan in a plan cache.

The query optimizer then checks (640) for the capability of partition-aware routing. For example, the decision about whether partition-aware routing can be activated depends on the complexity of the query. (Partition-aware routing may be unavailable for complex queries.) Also, use of partition-aware routing for partitioned tables can be enabled or disabled on a system-wide basis. If partition-aware routing cannot be activated, the technique (600) ends.

Otherwise (partition-aware routing can be activated), the query optimizer collects (650) partitioning criteria, location information and possibly other information for the partitioned table. For example, the query optimizer collects partitioning criteria for a partitioned table, location information for partitions of the table, information about the order of parameters in records and information about the data types of parameters in records, which can be used when calculating hash key values that map to partitions for a hash-partitioned table. Or, as another example, the query optimizer collects partitioning criteria for a partitioned table and location information for partitions of the table, which can be used to create partition metadata for a round-robin-partitioned table. Alternatively, the partitioning criteria can facilitate partitioning according to individual data values for a given field of records or according to ranges of data values for a given field of records.

The query optimizer then creates and stores (660) partition metadata associated with the execution plan. The query optimizer transfers (670) the partition metadata to the client. For example, the partition metadata can be transferred to the client as part of a reply packet to the query from the client. The client device caches the partition metadata for use in client-side partition-aware routing of batch insert operations.

After partition metadata has been generated, the partition metadata can become outdated for various reasons. For example, based on decisions made at one or more database nodes in the distributed database system, a partition can move from one database node to another database node, or merge with another partition, or split into multiple partitions. Or, partitions can be reorganized across all database nodes. Or, a partition can be dropped or replaced with another partition having the same name or a different name. In these cases, incorrect partition-aware routing may occur (that is, data for a record may be sent to a database node that does not have the appropriate partition). If so, using partition metadata that has been updated, the incorrect database node can determine the database node that has the appropriate partition, and dispatch the data for the record to the correct database node (as described with reference to FIG. 3). Updated partition metadata can be forwarded to the client, which changes or replaces the previous partition metadata in its client-side cache, for use in subsequent client-side partition-aware routing.

V. Example Techniques for Client-Side Partition-Aware Insert Batching.

Figure 7:
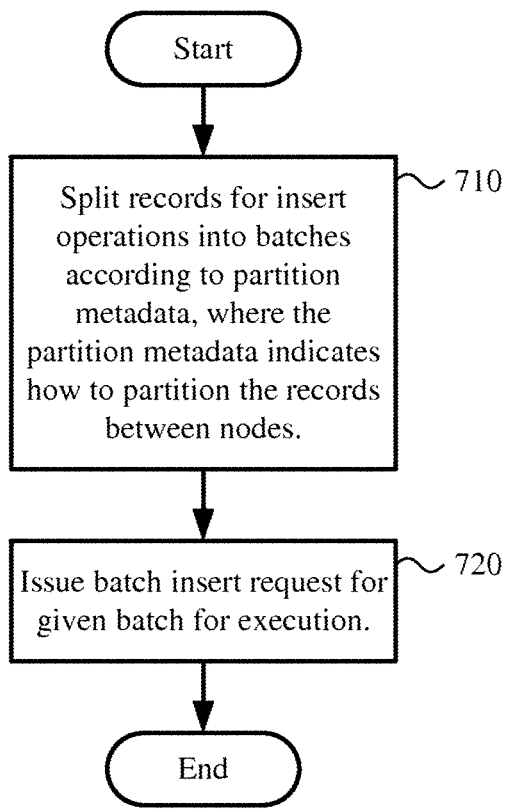
FIG. 7 is a flowchart illustrating a generalized technique for client-side splitting of records into batches according to partition metadata.

FIG. 7 shows a generalized technique (700) for client-side splitting of records into batches according to partition metadata. A client at a client device can perform the technique (700).

The client splits (710) records for insert operations into batches according to partition metadata. The partition metadata indicates how to partition the records between database nodes. For example, for one of the records, the client determines a database node of the database nodes and adds the record to one of the batches that is for the determined database node. Or, for one of the records, the client determines a location and adds the record to one of the batches that is for the location.

For hash-based partitioning, for one of the records, the client can select one of the database nodes (or a location) based on partitioning criteria for one or more data values of the record (e.g., one or more parameter values of a parameter set). For example, the client calculates a hash key from the one or more data values using the partitioning criteria. Or, for round-robin partitioning, the client selects one of the batches according to a round-robin pattern. For example, for a batch of 4000 records, the encoder selects a first database node for the first 1000 records, a second database node for the next 1000 records, a third database node for the next 1000 records, and a fourth database node for the final 1000 records. Alternatively, the client uses another partitioning approach (e.g., determining a partition (and hence database node or location) for a record based on the range that includes a data value for the record, or based on an individual data value for the record).

The client issues (720) a batch insert request for a given batch of the batches for execution (by a server that operates a database node for the given batch). The decision whether to issue a batch insert request for the given batch can depend at least in part on whether the given batch has been filled to a batch size. That is, the client issues a batch insert request for the given batch if the batch size has been reached, but otherwise continues to fill the given batch. The batch size can be 1000 records, 2000 records, or some other number of records. The decision whether to issue a batch insert request for the given batch can also depend at least in part on whether a last record of the records has been processed and/or whether a timer for the given batch has expired.

After issuing (720) a batch insert request for the given batch for execution, the client can continue splitting other records into batches without waiting for a reply from the server. A single thread at the client can perform the splitting operations, with insert requests issued batch-after-batch to database nodes for execution, such that different batches of insert operations can be executed in parallel at different database nodes.

In some scenarios, partition metadata may become outdated for various reasons (examples are listed above). The client can receive an update to its cached partition metadata, in which case the client can update (adjust, replace, etc.) the cached partition metadata to account for changes to partitioning criteria, the database nodes and/or the locations for the database nodes.

Figure 8:
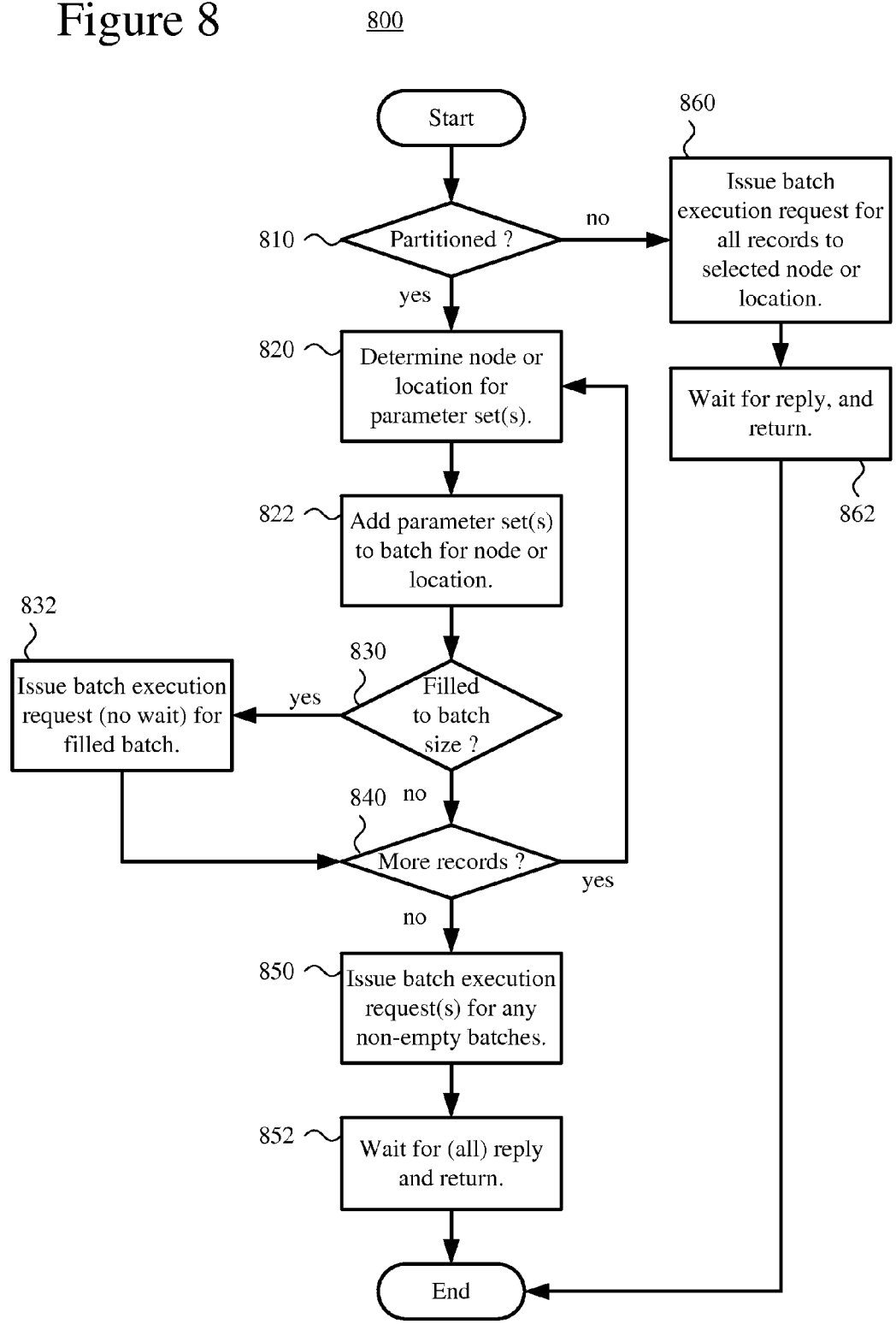
FIG. 8 is a flowchart illustrating an example technique for client-side splitting of parameter sets for records into batches according to partition metadata.

FIG. 8 shows an example technique (800) for client-side splitting of parameter sets for records into multiple batches according to partition metadata. A client at a client device can perform the technique (800) when executing a prepared statement associated with an execution plan for a query (e.g., a type of query for an insert operation) The execution plan indicates how to perform operations (at a database node) using instructions (e.g., compiled code). At runtime, the client executes the prepared statement to determine how to provide parameter sets (example of data for records) to be used with the execution plan. In this way, when processing batch insert requests, the client can dynamically separate parameters sets into batches for different database nodes or locations of partitions.

When it receives a request (e.g., from an application) to insert a batch of multiple records into a table, the client checks (810) whether the table is partitioned. If not, the client issues (860) a request for batch execution for all of the records in the request to one of the database nodes or locations. In this case, the database node that handles the batch execution can process the request as described with reference to FIG. 3, re-dispatching data for records to other database nodes according to server-side application of partitioning criteria, as needed. The client waits (862) for a reply, then returns.

On the other hand, if the table is partitioned, the client determines (820) a database node or location for each of one or more parameter sets and adds (822) the parameter set(s) to a batch for that database node or location. The cached partition metadata indicates how to determine the partition for the parameter set of a record, as well as where the partition is located. The way that the client determines (820) the appropriate database node or location depends on the partitioning approach. If the table is partitioned according to hash values, the client can calculate a hash value for a parameter set for a given record, select a database node or location using the hash value, and add the parameter set to a batch for the selected database node or location. Thus, for a hash-partitioned table, multiple data streams, queues, etc. (for the batches) are individually filled based on the partitioning criteria and the parameter values on a record-by-record basis. Or, if the table is partitioned according to a round-robin pattern, the client can select the database node or location by alternating among the partitions or the database nodes that have partitions, then add the parameter set(s) to a batch for the selected database node or location. The client can switch database nodes/locations on a record-by-record basis, filling the batches evenly. Or, the client can fill the batch for a given database node/location (up to its batch size) before starting to fill the batch for a next database node/location.

The client checks (830) whether the batch for the selected database node or location is full. For example, the client compares the current size of the batch to the batch size for a full batch. The batch size depends on implementation. Example batch sizes are 1000 records, 2000 records, or 10000 records. If the batch is filled, the client issues (832) a request for batch execution for the filled batch of records to the database node/location that is appropriate for the batch. An executor at that database node processes the batch insert request for the records, inserting each of the records in the appropriate partition. Meanwhile, however, the client does not wait for a reply from a server for the batch execution.

Instead, after issuing the request for batch execution for a filled batch, or if the batch is not filled, the client checks (840) whether there are any more records to process in the request. If so, the client processes the other record(s), determining (820) a database node or location for parameter set(s), adding (822) the parameter set(s) to a batch for that database node or location, etc. In this way, for each record in the batch request, the client computes the proper routing location for a parameter set at execution time.

When there are no more records, the client issues (850) a request for batch execution for any non-empty batch of records to the database node/location that is appropriate for that batch. An executor at that database node processes the batch insert request for the records, inserting each of the records in the appropriate partition. Finally, the client waits (852) for a reply for each of the batch execution requests that has been issued (at stage 832 for a filled batch, or at stage 850), then returns.

By issuing batch execution requests for filled batches in an asynchronous manner (without waiting for a reply from a server), a client can submit multiple batch insert requests before a first batch insert request finishes. The batch insert requests can be handled in parallel by different database nodes that store data associated with respective batch insert requests. Thus, the client facilitates parallelized execution over multiple database nodes of a distributed database system. In some example implementations, the client can run as a single thread at a client device, issuing batch execution requests to multiple database nodes at different servers.

When issuing a batch insert request for a table partitioned according to a round-robin pattern, the client can provide, along with the given batch, a flag that indicates the batch has already been partitioned. Based on the value of the flag, a database node can skip any round-robin partitioning at the server-side, since the client has already performed round-robin partitioning. Otherwise, a database node might itself perform round-robin distribution, re-dispatching parameter sets for records to other database nodes according to the round-robin pattern.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more tangible computer-readable media storing computer-executable instructions for causing a client programmed thereby to perform a method comprising:
   with the client, receiving a batch insert request comprising a plurality of insert operations for a partitioned table;
   with the client, splitting the plurality of insert operations into a plurality of operation batches according to partition metadata, wherein the partition metadata indicates how to partition the plurality of insert operations between a plurality of database nodes; and
   from the client, issuing the plurality of operation batches to the plurality of database nodes for execution according to the partition metadata.

2. The one or more computer-readable media of claim 1 wherein the splitting includes, for an insert operation of the plurality of insert operations:
   determining a database node of the database nodes; and
   adding the insert operation to an operation batch of the plurality of operation batches that is for the determined database node.

3. The one or more computer-readable media of claim 1 wherein the splitting includes, for an insert operation of the plurality of insert operations:
   determining a location; and
   adding the insert operation to an operation batch of the plurality of operation batches that is for the location.

4. The one or more computer-readable media of claim 1 wherein the splitting includes, for an insert operation of the plurality of insert operations:
   based on partitioning criteria for one or more data values of the insert operation, selecting one of the database nodes or a location.

5. The one or more computer-readable media of claim 4 wherein the selecting uses a hash key calculated from the one or more data values using the partitioning criteria.

6. The one or more computer-readable media of claim 1 wherein the splitting includes, for an insert operation of the plurality of insert operations:
   selecting one of the operation batches according to a round-robin pattern.

7. The one or more computer-readable media of claim 6 wherein the method further comprises:
   from the client, providing, along with the given operation batch, a flag that indicates the given operation batch has already been partitioned and should not be partitioned by the database node.

8. The one or more computer-readable media of claim 1 wherein the issuing depends at least in part on whether the given operation batch has been filled to a batch size.

9. The one or more computer-readable media of claim 1 wherein the issuing depends at least in part on whether a last insert operation of the plurality of insert operations has been processed.

10. The one or more computer-readable media of claim 1 wherein the issuing depends at least in part on whether a timer for the given operation batch has expired.

11. The one or more computer-readable media of claim 1 wherein the method further comprises:
    with the client, updating the partition metadata to account for changes to one or more of partitioning criteria, the database nodes, or locations for the database nodes.

12. The one or more computer-readable media of claim 1 wherein, after the issuing, the client continues the splitting without waiting for a reply from a server for the operation batch.

13. The one or more computer-readable media of claim 1 wherein a single thread at the client performs the splitting.

14. In a database system that includes a plurality of servers, each server operating a database node, to which a client device can issue requests for insert operations, a server of the plurality of servers, the server comprising a processing unit and memory, wherein the server is adapted to perform a method comprising:
- with the server, generating partition metadata that indicates how to partition insert operations between the plurality of database nodes, wherein the partition metadata includes partitioning criteria for insert operations, the partition criteria indicating, for the plurality of database nodes, which node is responsible for executing insert operations for particular partitions of a partitioned table;
- from the server, transferring the partition metadata to a client for use in client-side partition-aware routing, whereby the client issues batched insert operations directly to the plurality of database nodes according to the partition criteria of the partition metadata; and
- with the server, receiving a batch of insert operations from the client device, the batch of insert operations associated with a batch insert request executable at the plurality of servers, the batch of insert operations being executable at the server.

15. The server of claim 14 wherein the partition metadata is transferred as part of a reply to a request from the client to compile a query.

16. The server of claim 14 wherein the partition metadata is transferred as part of an update to previous partition metadata transferred to the client.

17. The server of claim 14 wherein a query optimizer of the server performs the generating.

18. A method comprising:
- with a client, receiving a batch insert request comprising a plurality of insert operations for a partitioned table;
- with the client, splitting the plurality of insert operations into a plurality of operation batches according to partition metadata received from a database server, including, for an insert operation of the plurality of insert operations:
  - based at least in part on the partition metadata, determining, from a plurality of database nodes, a database node indicated for processing the insert operation; and
  - adding the insert operation to the operation batch of the plurality of operation batches that is associated with the indicated database node; and
- from the client, after a given operation batch of the plurality of operation batches has been filled to a batch size, issuing the operation batch to the indicated node for the given operation batch for execution.

19. The method of claim 18 wherein the determining uses round-robin partitioning or hash-based partitioning.

20. The method of claim 18 wherein a single thread at the client performs the splitting, and wherein, after the issuing, the client continues the splitting without waiting for a reply from a server for the operation batch.

* * * * *